(12) United States Patent
Shan et al.

(10) Patent No.: US 10,505,599 B1
(45) Date of Patent: Dec. 10, 2019

(54) MATRIX EQUALIZATION COMPUTATION WITH PIPELINED ARCHITECTURE

(71) Applicant: Marvell International Ltd., Hamilton (BM)

(72) Inventors: Chao Shan, Milpitas, CA (US); Mao Yu, San Jose, CA (US); Yong Ma, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 16/264,543

(22) Filed: Jan. 31, 2019

Related U.S. Application Data

(60) Provisional application No. 62/782,183, filed on Dec. 19, 2018.

(51) Int. Cl.
*H04B 7/0456* (2017.01)
*H04L 25/02* (2006.01)
*H04W 84/12* (2009.01)

(52) U.S. Cl.
CPC ....... *H04B 7/0456* (2013.01); *H04L 25/0244* (2013.01); *H04W 84/12* (2013.01)

(58) Field of Classification Search
CPC ... H04B 7/0456; H04L 25/0244; H04W 84/12
See application file for complete search history.

(56) References Cited

U.S. PATENT DOCUMENTS

| | | | |
|---|---|---|---|
| 6,862,440 B2 | 3/2005 | Sampath | |
| 7,206,354 B2 | 4/2007 | Wallace et al. | |
| 7,486,740 B2 | 2/2009 | Inanoglu | |
| 7,729,439 B2 | 6/2010 | Zhang et al. | |
| 8,199,841 B1 | 6/2012 | Sarrigeorgidis et al. | |
| 8,270,909 B2 | 9/2012 | Zhang et al. | |
| 9,166,660 B2 | 10/2015 | Chu et al. | |
| 9,252,991 B2 | 2/2016 | Zhang | |

(Continued)

OTHER PUBLICATIONS

Ansari et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

(Continued)

*Primary Examiner* — Vineeta S Panwalkar

(57) ABSTRACT

A plurality of circuit units of a matrix processor of a communication device are used to decompose a plurality of channel matrices, corresponding to a plurality of orthogonal frequency division multiplexing (OFDM) tones, over a plurality of cycles to determine matrix equalizer coefficients. Decomposing the plurality of channel matrices includes determining respective modes of operation for respective ones of the circuit units for respective ones of the cycles. The respective modes of operation are selected from a set of modes that includes at least one of a bypass mode for propagating input signals to output signals without altering the input signals and an idle mode for saving power when a particular circuit unit is not needed during a particular cycle. The respective circuit units are individually controlled to operate in the determined respective modes during the corresponding cycles. The determined matrix coefficients are then applied to received data signals.

20 Claims, 11 Drawing Sheets

(56) References Cited

U.S. PATENT DOCUMENTS

| | | | |
|---|---|---|---|
| 2006/0063492 | A1 | 3/2006 | Iacono et al. |
| 2011/0261708 | A1 | 10/2011 | Grandhi |
| 2012/0039196 | A1 | 2/2012 | Zhang |
| 2012/0062421 | A1* | 3/2012 | Su .................. H04B 7/0417 342/373 |
| 2016/0359532 | A1* | 12/2016 | Cao .................. H04B 7/0421 |

OTHER PUBLICATIONS

Chun et al., "Legacy Support on HEW frame structure," doc: IEEE 11-13/1057r0, *The Institute of Electrical and Electronics Engineers, Inc.*, pp. 1-8 (Sep. 2013).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE Std 802.11ac™-2013 "IEEE Standard for Information Technology—Telecommunications and information exchange between systems—Local and metropolitan area networks—Specific requirements, Part 11: Wireless Lan Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," the Institute of Electrical and Electronics Engineers, Inc., pp. 1-535 (Oct. 2009).

Love et al., "An Overview of Limited Feedback in Wireless Communication Systems," IEEE J. on Selected Areas in Communications, vol. 26, No. 8, pp. 1341-1365 (Oct. 2008).

Seok et al., "HEW PPDU Format for Supporting MIMO-OFDMA," IEEE 802.11-14/1210r0, 16 pages, (Sep. 14, 2014).

Stacey, "Specification Framework for TGax," doc. IEEE 802.11-15/0132r12, vol. 802.11ax, No. 12, 38 pages (Dec. 1, 2015).

Zhang et al., "11 ac Explicit Sounding and Feedback", *The Institute of Electrical and Electronics Engineers*, doc. No. IEEE 802.11-10/1105r0, 44 pages (Sep. 2010).

\* cited by examiner

*FIG. 6B*

| i | $\alpha_i = \tan^{-1}(2^{-i})$ | |
|---|---|---|
| | $\alpha_i$ Degree | $\tan(\alpha_i)$ |
| 0 | 45 | 1/2 |
| 1 | 26.56505118 | 1/4 |
| 2 | 14.03624347 | 1/8 |
| 3 | 7.125016349 | 1/16 |
| 4 | 3.576334375 | 1/32 |
| 5 | 1.789910608 | 1/64 |
| 6 | 0.89517371 | 1/128 |
| 7 | 0.447614171 | 1/256 |
| 8 | 0.2238105 | 1/512 |
| 9 | 0.111905677 | 1/1024 |
| 10 | 0.055952892 | 1/2048 |

$K = \cos(45°)\cos(26.565°) \times \cdots \times \cos(0.05595°) = 0.60$
72 x_k_scale    x/2+x[11]/8−x[11]/64−x[11]/512
y_k_scale    y/2+x[11]/8−y[11]/64−y[11]/512

MATRIX EQUALIZATION COMPUTATION WITH PIPELINED ARCHITECTURE

CROSS-REFERENCES TO RELATED APPLICATIONS

This application claims the benefit of U.S. Provisional Patent Application No. 62/782,183, entitled "8 RX-Antenna X8 HE-LTF Spatial Streams MEQ QR Decomposition Structure and Implementation," filed on Dec. 19, 2018, the disclosure of which is hereby expressly incorporated herein by reference in its entirety.

FIELD OF THE DISCLOSURE

The present disclosure relates generally to communication networks and, more particularly, to wireless local area networks that utilize orthogonal frequency division multiplexing (OFDM).

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method comprises: providing, at a communication device to a matrix processor of the communication device, a plurality of channel matrices corresponding to a plurality of orthogonal frequency division multiplexing (OFDM) tones, the plurality of channel matrices determined based on training signals received by the communication device, wherein the matrix processor includes a plurality of circuit units configured to perform matrix rotation operations; decomposing, using the plurality of circuit units over a plurality of cycles, the plurality of channel matrices to determine matrix equalizer coefficients corresponding to the plurality of OFDM tones, wherein decomposing the plurality of channel matrices includes determining respective modes of operation for respective ones of the circuit units for respective ones of the cycles, the respective modes of operation selected from a set of modes that includes at least one of i) a bypass mode for propagating input signals to output signals without altering the input signals and ii) an idle mode for saving power when a particular circuit unit is not needed during a particular cycle, and individually controlling the respective circuit units to operate in the determined respective modes during the corresponding cycles; and applying, at the communication device, the determined matrix coefficients to data signals received by the communication device.

In another embodiment, an apparatus comprises: a matrix processor comprising a plurality of circuit units configured to perform matrix rotation operations, the matrix processor configured to decompose, using the plurality of circuit units over a plurality of cycles, a plurality of channel matrices corresponding to a plurality of orthogonal frequency division multiplexing (OFDM) tones, wherein the plurality of channel matrices are determined based on received training signals; and a controller configured to control operation of respective circuits units of the plurality of circuit units during decomposition of the plurality of channel matrices, the controller being configured to determine respective modes of operation for respective ones of the circuit units for respective ones of the cycles, the respective modes of operation selected from a set of modes that includes at least one of i) a bypass mode for propagating input signals to output signals without altering the input signals and ii) an idle mode for saving power when a particular circuit unit is not needed during a particular cycle, and individually control the respective circuit units to operate in the determined respective modes during the corresponding cycles.

BRIEF DESCRIPTION OF THE DRAWINGS

FIGS. 6A-6B are diagrams illustrating a first step of decomposing to an 8×8 channel matrix, according to an embodiment;

DETAILED DESCRIPTION

Embodiments of wireless receiver architectures are discussed below in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, similar wireless receiver architectures are utilized in other types of wireless communication systems such as personal area networks (PANs), mobile communication networks such as cellular networks, metropolitan area networks (MANs), satellite communication networks, etc.

In a wireless receiver, communication channel equalizer coefficients are determined based on decomposing channel matrices corresponding to a plurality of orthogonal frequency division multiplexing (OFDM) tones, where each respective channel matrix has dimensions of $N_{rx} \times N_{ss}$, where $N_{rx}$ is the number of receive antennas and $N_{ss}$ is the number of spatial streams in a communication channel between a transmitter and the receiver. Decomposing such channel matrices becomes more complex with increasing numbers of OFDM tones, receive antennas and/or special streams. In various embodiments described below, an efficient pipelined matrix equalizer architecture is utilized that reduces circuit area, power consumption and/or cost of the matrix equalizer, for example by cyclically reusing circuits for performing various matrix operations to decompose the plurality of channel matrices corresponding to the plurality of OFDM tones, and individually controlling the circuits on per-cycle and per-matrix configuration basis so that circuits that are not used for performing matrix operations in particular cycles and/or for particular matrix configurations are reused as bypass circuits or are disabled to save power.

Figure 1:
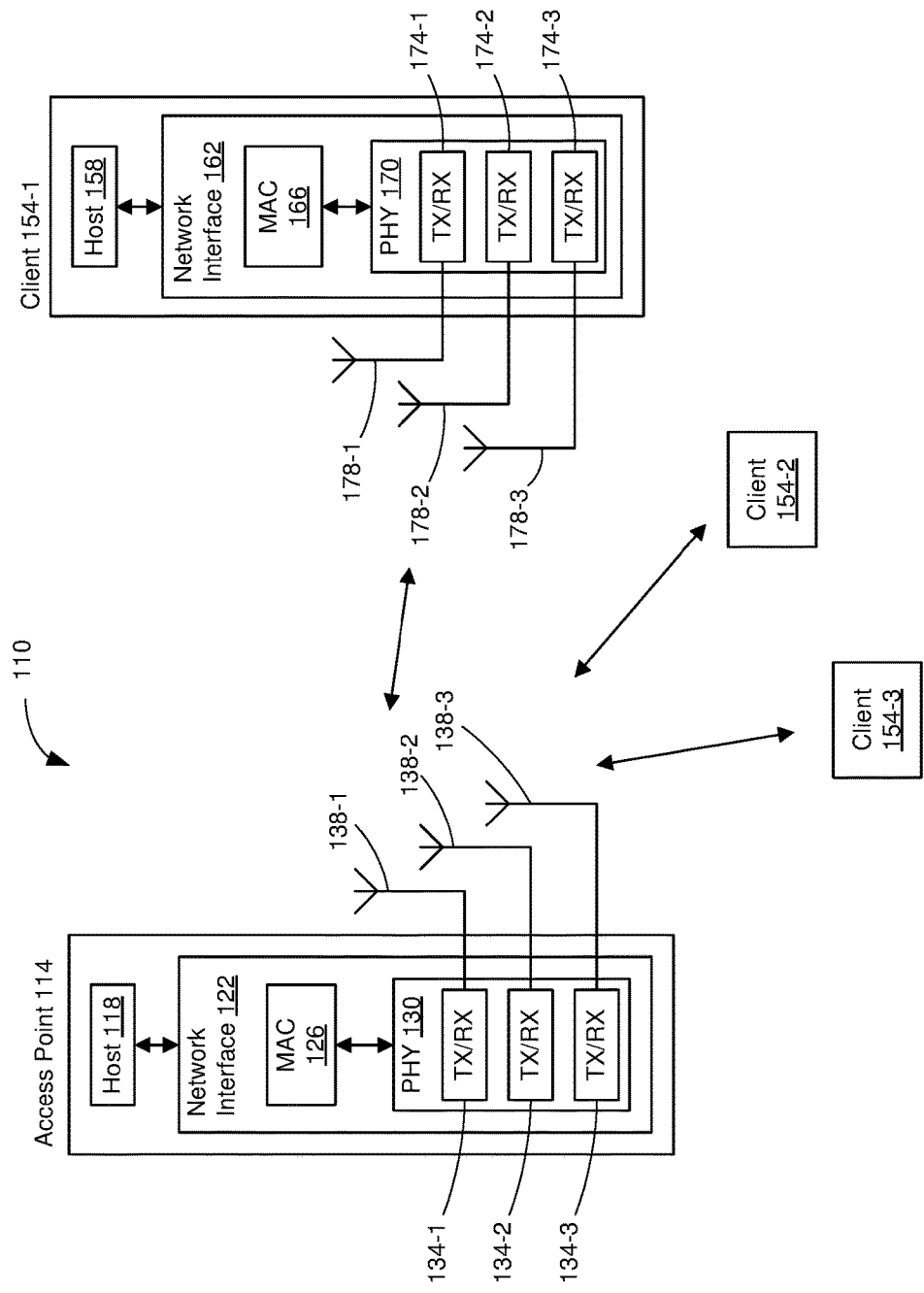
FIG. 1 is a block diagram of an example wireless local area network (WLAN), according to an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PPDUs (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 additionally or alternatively includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 additionally or alternatively includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
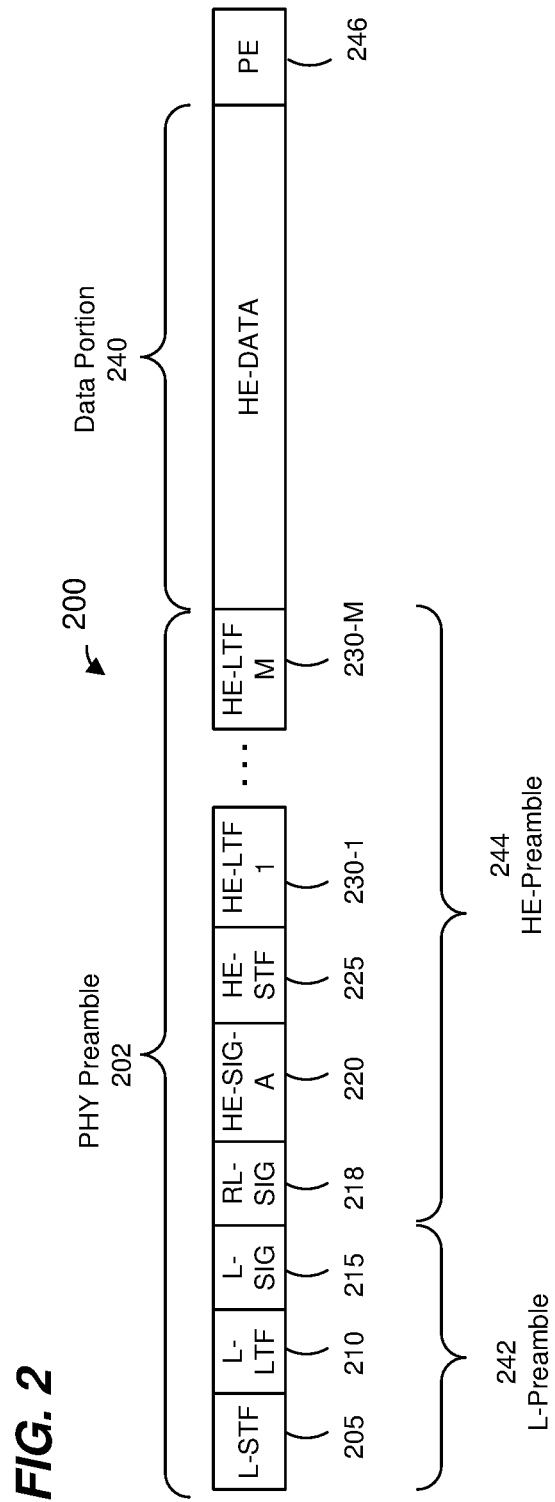
FIG. 2 is a diagrams of a physical layer (PHY) data unit, according an embodiment.

FIG. 2 is a diagram of an example PPDU 200 that the network interface 122 (FIG. 1) is configured to generate and transmit to one client station 154 (e.g., the client station 154-1), according to an embodiment. The network interface 162 (FIG. 1) may also be configured to transmit PPDUs the same as or similar to the PPDU 200 to the AP 114. The PPDU 200 may occupy a 20 MHz bandwidth or another suitable bandwidth. Data units similar to the data unit 200 occupy other suitable bandwidth such as 40 MHz, 80 MHz, 160 MHz, 320 MHz, 640 MHz, for example, or other suitable bandwidths, in other embodiments.

The PPDU 200 includes a PHY preamble 202 including a legacy short training field (L-STF) 205, a legacy long training field (L-LTF) 210, a legacy signal field (L-SIG) 215, a repeated L-SIG field (RL-SIG) 218, a high efficiency (HE) signal field (HE-SIG-A) 220, an HE short training field (HE-STF) 225, and M HE long training fields (HE-LTFs) 230, where M is a suitable positive integer. In an embodiment, M generally corresponds to (e.g., is greater than or equal to) a number of spatial streams via which the PPDU 200 will be transmitted. A legacy preamble (L-preamble) 242 of the PHY preamble 202 includes the L-STF 205, L-LTF 210 and L-SIG 215. An HE preamble portion 244 of the PHY preamble 202 includes the RL-SIG 218, the HE-SIG-A 220, the HE-STF 225 and the M HE-LTFs 230. The PPDU 200 also includes a PHY data portion 240. In some scenarios, the PPDU 200 may omit the PHY data portion 240. The PPDU 200 may also optionally include a packet extension (PE) field 246 with arbitrary data to provide additional processing time, for processing the PPDU 200, to a receiver of the PPDU 200.

In an embodiment, the L-STF 205 includes a signal that is configured to permit a wireless receiver to perform one or more functions such as i) packet detection, ii) initial synchronization, and iii) AGC adjustment. In an embodiment, the L-LTF 210 includes a signal that is configured to permit the wireless receiver to perform one or more functions such as i) channel estimation and ii) fine synchronization. In an embodiment, the HE-STF 225 includes a signal that is configured to permit the wireless receiver to perform a function such as AGC refinement. In an embodiment, the HE-LTFs 230 includes signals that are configured to permit the wireless receiver to perform a function such as channel estimation for a multiple input, multiple output (MIMO) channel that employs multiple spatial streams.

In an embodiment, the duration of each HE-LTF 230 is 12.8 µs plus a duration of a guard interval (GI). In an embodiment, the duration of the GI 0.8 µs. In this embodiment, the duration of each HE-LTF 230 is 13.6 µs.

In an embodiment, the HE-SIG-A 220 generally carries information about the format of the packet (e.g., a PPDU) 200, such as information needed to properly decode at least a portion of the packet 200, in an embodiment. In some embodiments, HE-SIG-A 220 additionally includes information for receivers that are not intended receivers of the packet 200, such as information needed for medium protection, spatial reuse, etc. In an embodiment, the HE-SIG-A 220 includes information that indicates a data rate that is used in the PHY data portion 240. For example, in an embodiment, the HE-SIG-A 220 includes a subfield that indicates a modulation and coding scheme (MCS) that is used in the PHY data portion 240. In another example, in an embodiment, the HE-SIG-A 220 includes a subfield that indicates a number of spatial streams used in the PHY data portion 240.

In some embodiments, the PHY preamble 202 omits one or more of the fields 205-230. In some embodiments, the PHY preamble 202 includes additional fields not illustrated in FIG. 2. For instance, in an embodiment, the HE-preamble 244 may include one or more additional signal field(s) to facilitate multi-user MIMO (MU-MIMO) and/or orthogonal frequency division multiple access (OFDMA) transmissions.

Each of the L-STF 205, the L-LTF 210, the L-SIG 215, the RL-SIG 218, the HE-SIG-A 220, the HE-STF 225, and the M HE-LTFs 230 comprises one or more orthogonal frequency division multiplexing (OFDM) symbols. As merely an illustrative example, the HE-SIG-A 220 comprises two OFDM symbols.

In the illustration of FIG. 2, the packet 200 includes one of each of the L-STF 205, the L-LTF 210, the L-SIG 215, the RL-SIG 218 and the HE-SIG-A 220. In some embodiments in which a packet similar to the packet 200 occupies a cumulative bandwidth other than 20 MHz, each of the L-STF 205, the L-LTF 210, the L-SIG 215, the RL-SIG 218, and the HE-SIG-A 220 is repeated over a corresponding number of 20 MHz sub-bands of the whole bandwidth of the packet, in an embodiment. For example, in an embodiment in which the packet 200 occupies an 80 MHz bandwidth, the packet 200 includes four of each of the L-STF 205, the L-LTF 210, the L-SIG 215, the RL-SIG 218, and the HE-SIG-A 220.

The data unit 200 is a single user (SU) data unit transmitted to (or by) a single client station 25, in an embodiment. In another embodiment, the data unit 200 is a multi-user (MU) data unit in independent data streams are simultaneously transmitted to (or by) multiple client stations 25, where each of the data streams is transmitted using one or more spatial streams within the data unit 200. In an embodiment in which the data unit 200 is an MU data unit, the HE-SIGB fields 235 in the data unit 200 are spatially mapped by a vector $QP_1$, where Q is an antenna map or spatial mapping matrix that maps spatial streams, or space-time streams if space-time encoding is utilized, to transmit antennas, and $P_1$ is a first column in a spatial stream mapping matrix P, which is a Hadamard matrix in which each element of P is +1 or −1, in an embodiment. In another embodiment, each element of P is a complex number (e.g., a Discrete Fourier Transform matrix is used as P). In another embodiment, some elements of P are integers other than +1 or −1. In an embodiment, $P_1$ corresponds to a first spatial stream.

In an embodiment, as each HE-LTF 230 is generated, a separate column of the matrix P is used to map the values to spatial streams. For example, the first column of the matrix P, i.e., $P_1$, is applied to the signal HE-LTF1 230-1, the second column of the matrix P, i.e., $P_2$, is applied to the signal HE-LTF2, etc., in an embodiment. Thus, a client station 25 may use the channel estimation from the HE-LTF1 to decode the HE-SIGB field 235, in an embodiment. According to another embodiment, the HE-SIGB is spatially mapped by a vector $QP_N$ so that a client station 25 may use the channel estimation from the HE-LTFN 230-M to decode the HE-SIGB 235, in another embodiment.

Figure 3:
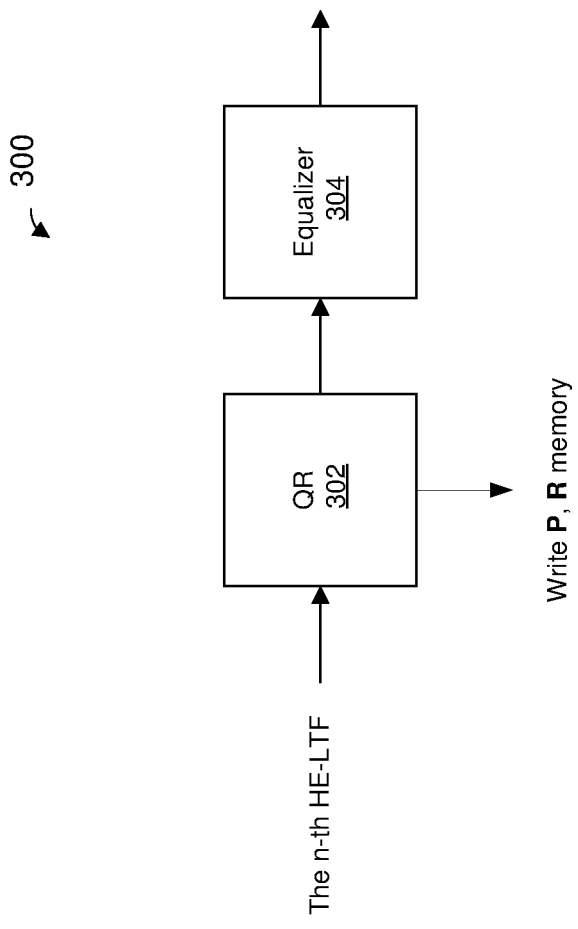
FIG. 3 is a block diagram of an example matrix equalizer in the context of determining matrix equalizer coefficients, according to an embodiment.

FIG. 3 is a block diagram of an example matrix equalizer engine 300 in the context of determining matrix equalizer coefficients, according to an embodiment. The matrix equalizer engine 300 is included in a PHY processor, such as the PHY processor 130 or the PHY processor 170 of FIG. 1, according to an embodiment. In other embodiments, matrix equalizer engine 300 is included in a suitable communication device different from the communication devices of FIG. 1.

In FIG. 3, the matrix equalizer engine 300 is illustrated in the context of processing a channel matrix determined based on training signals, such as HE-LTFs 230 of FIG. 2. Each HE-LTF includes a plurality of training symbols, in an embodiment. In an embodiment, at the transmitter of a packet, each training symbol is multiplied by a corresponding column of a preamble steering matrix P, wherein a number of rows of the matrix P corresponds to the number of spatial streams, and a number of columns of the matrix P corresponds to the number of HE-LTFs. Matrix P is configured to improve the orthogonality of the training symbols as they are transmitted from the antennas of the transmitter.

A receiver knows what training symbols were transmitted in the HE-LTFs and also knows the matrix P. Based on the received HE-LTF fields, the known training symbols, and the matrix P, the receiver generates a channel estimate matrix H (sometimes referred to herein as "channel matrix H" for simplicity). The matrix equalizer engine 300 is used by a receiver to process the channel matrix H to determine equalizer coefficients, in an embodiment Also, as will be described with reference to FIG. 4, the matrix equalizer engine 300 is used to apply an equalizer matrix to received data, in an embodiment.

The matrix equalizer engine 300 includes a QR decomposition processor 302. The QR decomposition processor is coupled to a P memory and an R memory (not shown). Generally speaking, QR decomposition is a method in which a matrix is decomposed into a Q matrix multiplied by an R matrix, wherein the Q matrix is an upper triangular matrix and the R matrix is a unitary (orthonormal) matrix (i.e., $R^H R = I$) (wherein the Hermitian operator $^H$ stands for transpose conjugate) and. The QR decomposition processor 302 iteratively decomposes the channel matrix H to determine an upper triangular matrix Q and a unitary matrix R, in an embodiment. The QR decomposition processor further processes the upper triangular matrix Q to determine a diagonal matrix R, in some embodiments. In an embodiment, QR decomposition involves iteratively decomposing a matrix (e.g., the channel matrix H or the upper triangular matrix Q) by iteratively rotating complex elements of the matrix. In an embodiment, the QR decomposition processor 302 decomposes the matrix by iteratively multiplying the complex elements of the channel matrix H by successions of constant values. For example, the QR decomposition processor 302 implements a Givens rotations algorithm, a Householder reflections algorithm, etc., to iteratively decompose the matrix.

The QR decomposition processor 302 is coupled to an equalizer 304, in an embodiment. The equalizer 304 is used to apply equalization to processed data symbols in a data portion of a packet, in an embodiment. The equalizer 304 is not used during processing of the channel matrix H, in an embodiment. The equalizer 304 is disabled during processing of the channel matrix H to save power, in an embodiment.

Figure 4:
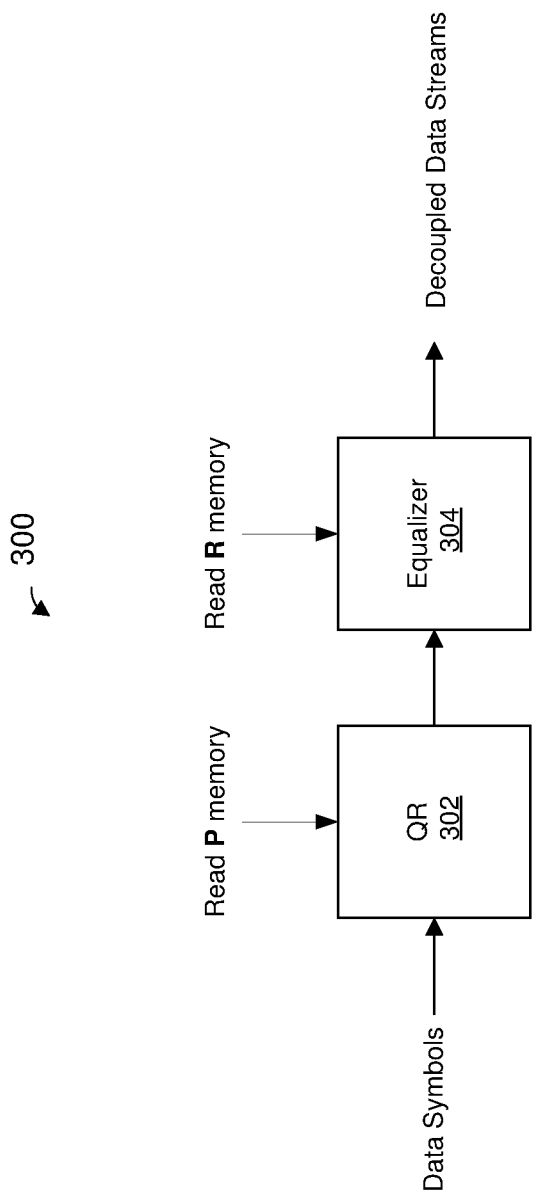
FIG. 4 is a block diagram showing the matrix equalizer of FIG. 3 in the context of processing data symbols.

FIG. 4 is a block diagram showing the matrix equalizer engine 300 in the context of processing data symbols. In an embodiment, the QR decomposition processor 304 receives and process data symbols. The QR decomposition processor applies an inverse of the upper triangular matrix Q determining during processing of HE-LTFs of a packet to data symbols of the packet, to remove effects of the channel H from the data symbols, in an embodiment. FIG. 4 illustrates that, when processing the data symbols, the QR decomposition processor 204 applies rotations that were stored in the P memory component of the QR processing block of FIG. 3. The rotation process performed to apply the rotations is similar to the rotation process performed in connection with QR decomposition as described above with respect to FIG. 3, in an embodiment. The equalizer 304 further processes the data, in an embodiment. The equalizer 304 equalizes the data using elements of the diagonal matrix R. In an embodiment, the equalizer 304 is a zero forcing (ZF) equalizer. In another embodiment, the equalizer 304 is another suitable type of equalizer. The output of the equalizer 304 is used to make decisions regarding modulations symbols that were actually transmitted by the transmitter, in an embodiment.

Figure 5:
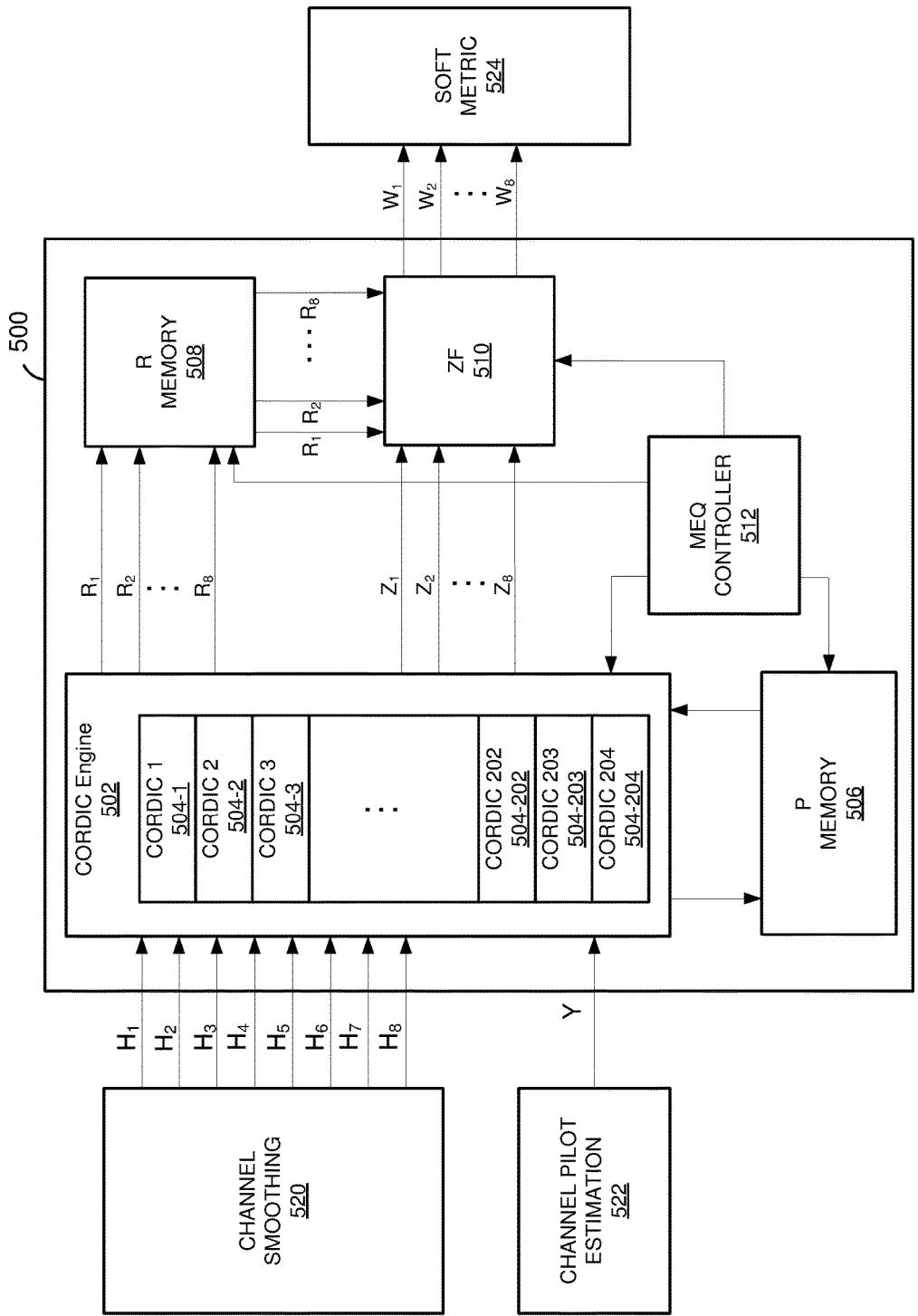
FIG. 5 is a block diagram of the matrix equalizer of FIGS. 3 and 4 in more detail, according to an embodiment.

FIG. 5 is a block diagram of a matrix equalizer 500, according to an embodiment. The matrix equalizer 500 corresponds to the matrix equalizer 300 of FIGS. 3 and 4, in an embodiment. The matrix equalizer 500 is included in a PHY processor, such as the PHY processor 130 or the PHY processor 170 of FIG. 1, according to an embodiment. In other embodiments, the matrix equalizer 500 is included in a suitable communication device different from the communication devices of FIG. 1.

The matrix equalizer 500 includes a coordinate rotation digital calculation (CORDIC) engine 502 comprising a plurality of CORDIC calculators 504. The CORDIC engine 502 is coupled to a P memory 506 and an R memory 508. The CORDIC engine 502 is also coupled to a ZF equalizer 510. Additionally, the R memory 508 is coupled to the ZF equalizer 510. The matrix equalizer 500 also includes a controller 512 coupled to the CORDIC engine 502, the P memory 506, the R memory 508 and the ZF equalizer 510.

The matrix equalizer 500 is configured to operate in a channel matrix decomposition mode to decompose channel matrices and determine matrix equalizer coefficients during training fields (e.g., HE-LTFs 230 of FIG. 2) of a data unit, in an embodiment. The matrix equalizer 500 is also configured to operate in a data mode to apply matrix equalization using the determined matrix equalizer coefficients to data symbols during a data portion of the data unit, in an embodiment. In an embodiment, the matrix equalizer 500 is configured to support data units of different channel bandwidths and corresponding different numbers of subcarriers (OFDM tones) in the training fields and the data portion of the data unit. For example, in an embodiment, the matrix equalizer 500 is configured to support the following bandwidth/subcarrier combinations: 20 MHz bandwidth with 234 subcarriers in each training field (e.g., each HE-LTFs 230), 40 MHz bandwidth with 468 subcarriers in each training field (e.g., each HE-LTFs 230), 80 MHz bandwidth with 980 subcarriers in each training field (e.g., each HE-LTFs 230), and a combined 80+80 MHz bandwidths with 980 subcarriers in each training field (e.g., each HE-LTFs 230) corresponding to each 80 MHz of the combined bandwidth.

The matrix equalizer 500 is additionally or alternatively configured to support a plurality of modes corresponding to different combinations of receive antennas and spatial streams. As an example, in an embodiment, the matrix equalizer 500 is configured to support some or all possible combinations of number of receive antennas (NRx) and number of spatial streams (Nss), where $1 \leq Nss \leq 8$ and $Nss \leq Nrx \leq 8$. In this embodiment, the matrix equalizer 500 is configured to support some or all of the following NRx×Nss combinations: 8×8, 8×7, 7×7, 8×6, 7×6, 6×6, 8×5, 7×5, 6×5, 5×5, 8×4, 7×4, 6×4, 5×4, 4×4, 8×3, 7×3, 6×3, 5×3, 4×3, 3×3, 8×2, 7×2, 6×2, 5×2. In some embodiments, the matrix equalizer 500 is additionally or alternatively configured to support one or more space-time block coding (STBC) modes with multiple (e.g., 2) spatial timing streams. For example, the matrix equalizer 500 is additionally or alternatively configured to support 8×1, 7×1, 6×1, 5×1, 4×1, 3×1, 2×1 and 1×1 STBC modes with 2 spatial timing streams. In some embodiments, the matrix equalizer 500 is additionally or alternatively configured to support one or more combined bandwidth channel modes. For example, the matrix equalizer 500 is additionally or alternatively configured to support 4×4, 4×3, 3×3, 4×2, 3×2 and 2×2 with combines 80+80 MHz channels, and 4×1, 3×1, 2×1 and 1×1 with combines 80+80 MHz channels and STBC with 2 spatial timing streams.

In an embodiment, the matrix equalizer 500 is configured such that the matrix equalizer 500 efficiently handles the different supported bandwidths and modes corresponding to different combinations of Rx antennas and spatial streams. In an embodiment, the matrix equalizer 500 is configured to support the highest number of subcarriers (e.g., corresponding to largest supported bandwidth) and the combination with the highest number of receive antennas and spatial streams, and downward extension is used to efficiently reconfigure the matrix equalizer 500 when the matrix equalizer 500 is to process fewer number of number of subcarriers (e.g., corresponding to a smaller bandwidth) and/or a combination with fewer number of Rx antennas and/or spatial streams. For example, the matrix equalizer 500 is configured to support the 8×8 mode with 980 subcarriers (corresponding to 80 MHz bandwidth), and downward extension is implemented when the matrix equalizer 500 is to process channel matrices corresponding to other modes (e.g., 8×7, 7×7, etc.) and/or other bandwidths, in some embodiments. As will be explained in more detail below, downward extension involves disabling and/or bypassing components of the matrix equalizer 500 that are not needed for performing certain operations due to the reduction in matrix dimensions in the different supported modes or reduction of the number of matrices corresponding to the different numbers of OFDM tones, in various embodiments.

When operating in channel matrix decomposition mode, the CORDIC engine 512 of the matrix equalizer 500 is configured to receive and decompose a plurality of channel matrices corresponding to a plurality of OFDM tones, in an embodiment. The CORDIC engine 502 is coupled to a channel smoothing processor 520, in an embodiment. The CORDIC engine 512 receives and processes smoothed channel matrices received from the smoothing processor 520, in this embodiment. The CORDIC calculators 504 of the CORDIC engine 512 are configured to perform vector and rotation operations for decomposing the channel matrices. In some embodiments, for example when the matrix equalizer 500 supports many (e.g., up to 8) spatial streams and many (e.g., 980) OFDM tones, providing separate CORDIC calculators 504 to perform vector/rotation operations in parallel to process channel matrices corresponding to all of the spatial streams and all of the OFDM tones would result in large circuit area, high power consumption, high cost etc. of the CORDIC engine 502. In an embodiment, the CORDIC engine 502 utilizes a pipelined architecture that reduces the number of CORDIC calculators 504 by pipelining the processing of channel matrices corresponding to the spatial streams and the OFDM tones. In particular, in an embodiment, multiple CORDIC cycles are used to process a plurality of channel matrices corresponding to a plurality of OFDM tones, where a portion of CORDIC operations needed to fully decompose the channel matrices is performed in each of the CORDIC cycles. For example, to decompose 8×8 channel matrices corresponding to a plurality of OFDM tones, the CORDIC calculators 504, in a first CORDIC cycle, are used to perform a first subset of operations on a first subset of spatial streams and a first subset of OFDM tones, and then, in a second CORDIC cycle, reused to perform i) a second subset of operations on the first subset of spatial streams and the first subset of OFDM tones and/or ii) to perform the first subset of operations on a second subset of spatial streams and a second subset of OFDM tones in a second CORDIC cycle, and so on, in an embodiment.

In an embodiment, the number of CORDIC calculators 504 included in the CORDIC engine 502 is determined based on one or all of i) a greatest number of OFDM tones supported by the matrix equalizer 500, ii) a greatest number of Rx antennas supported by the matrix equalizer 500, iii) a greatest number of spatial streams (e.g., 8×8) supported by the matrix equalizer 500, and iv) a processing time in which processing of the channel matrices is to be completed by the matrix equalizer 500. In an embodiment, for example, the CORDIC engine 502 includes 204 CORDIC calculators 504 to process 980 8×8 channel matrices in under 13.6 µs, which corresponds to a total duration of an HE-LTF field 230 including a guard interval. In another embodiment, the CORDIC engine 502 includes fewer than or more than 204 CORDIC calculators 504.

Figure 6A:
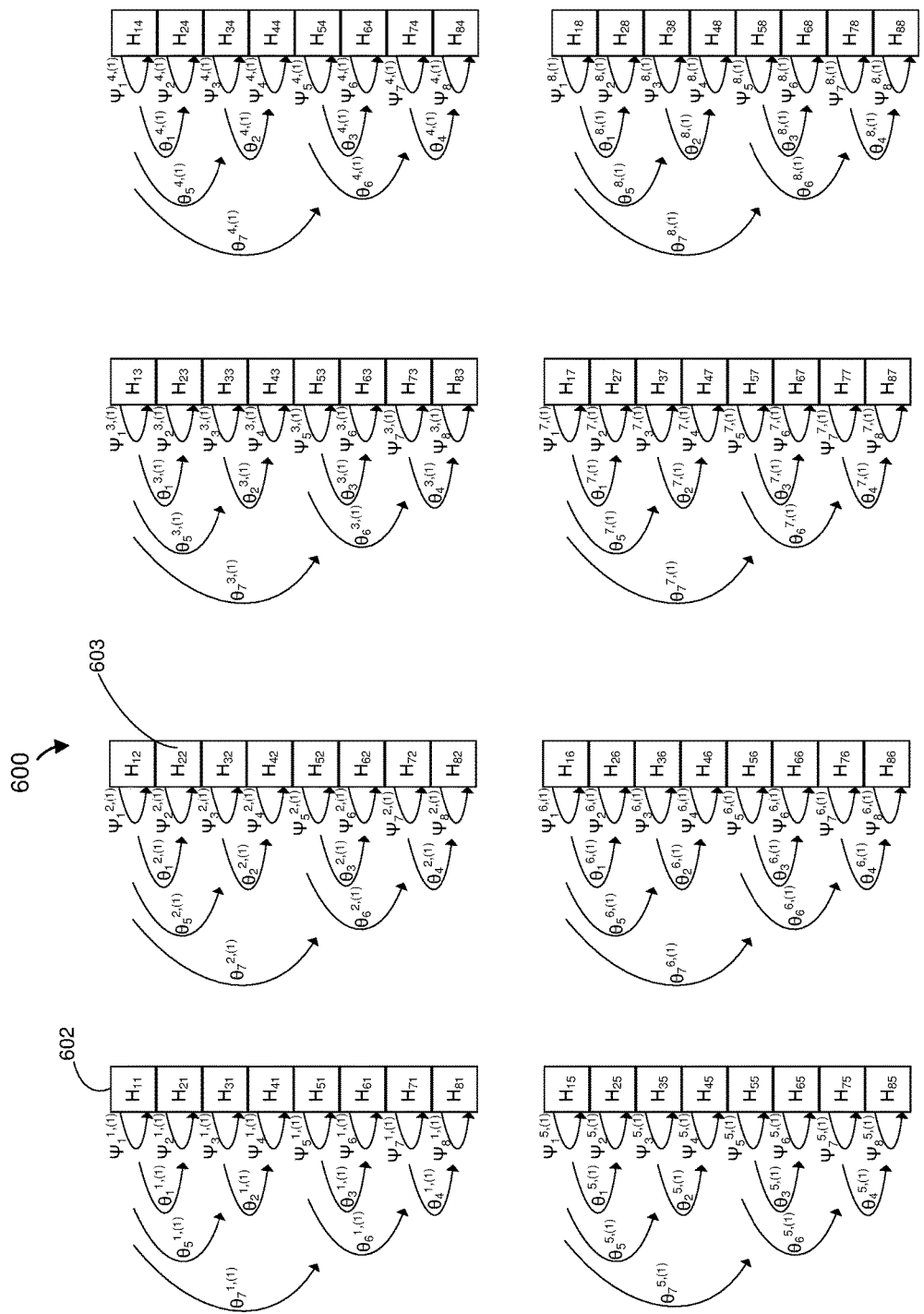
Figure 6B:
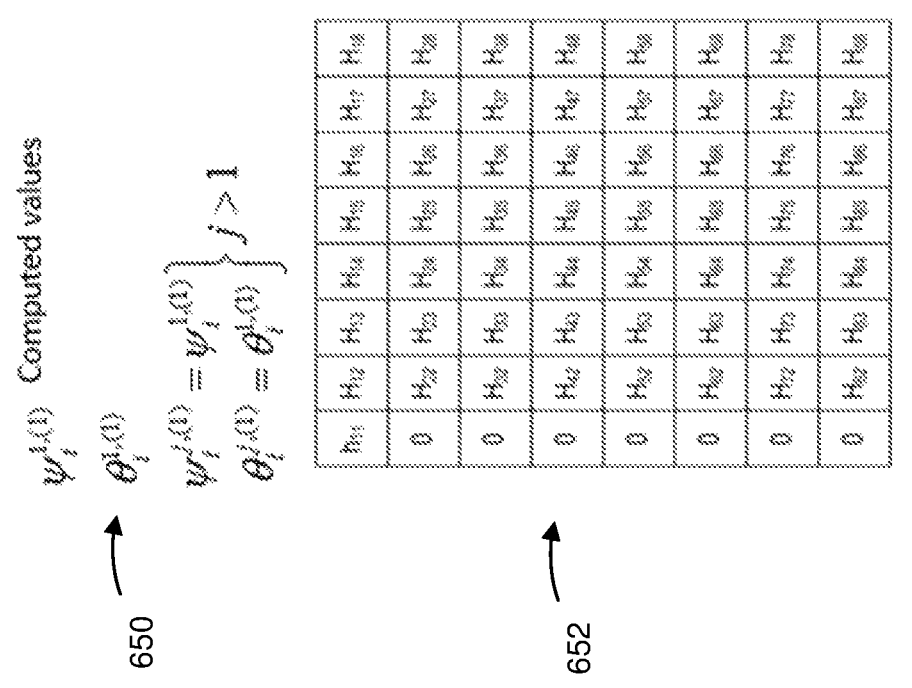

In an embodiment, the CORDIC engine 502 is configured to receive respective channel matrices for up to eight spatial streams (e.g., respective matrices $H_1$-$H_8$), and to cyclically process the channel matrix using the CORDIC calculators 504 to decompose each matrix and, based on decomposition of each matrix, to determine phase (Q) and real values (R) and to store the determined Q and R values in memory to be subsequently used for processing data symbols. Generally, decomposition of a channel matrix is performed in multiple steps, each step processing channel matrix coefficients corresponding to a respective one of the spatial streams. An example first step corresponding to an 8×8 channel matrix for a single OFDM tone is described with respect to FIGS. 6A-6B. In the first step, the CORDIC engine 502 processes the first column of the channel matrix corresponding to the first spatial stream, in an embodiment. In particular, the CORDIC engine 502 determines rotation angles $\psi$ (also sometimes referred to herein as rotation angles $\phi$) that make complex elements $H_{11}$-$H_{81}$ in the first column become real numbers. Also in the first step, the CORDIC engine 502 determines rotation angles $\theta$ that make the real numbers $h_{12}$-$h_{81}$ become zeros. Accordingly, in the first step, rotation angles are determined that make the element $H_{11}$ 602 become a real number $h_{11}$ and the elements $H_{21}$-$H_{81}$ are zeroed out. Referring briefly to FIG. 6B, computed rotation angles 650 correspond to rotation angles $\psi$ and $\theta$ computed in the first step, and a matrix 652 corresponds to a matrix with elements rotated by the determined rotation angles 650. The first step is performed using a total of 169 CORDIC operations, in an embodiment.

Referring again to FIG. 6A, in a second step, the CORDIC engine 502 performs a similar process to process the second column of the channel matrix corresponding to the second spatial stream, using the rotation angles $\psi$ and $\theta$ determined in the first step for the first spatial stream. In this process, in the second step, the CORDIC engine 502 determines rotation angles $\psi$ and $\theta$ such that the element $H_{22}$ 603 becomes a real number $h_{12}$ and elements $H_{32}$-$H_{82}$ are zeroed out. The second step is performed using a total of 127 CORDIC operations, in an embodiment. The CORDIC engine 502 similarly performs subsequent steps three through eight to process columns corresponding to spatial streams three through eight, in an embodiment. After the eights step is performed, rotation angles $\psi$ and $\theta$ resulting in an upper triangular matrix with elements are the diagonal of the matrix being real numbers $h_{11}$-$h_{88}$ are determined, in an embodiment. The CORDIC engine 502 stores the determined rotation angles $\psi$ and $\theta$ in the P memory 506, in an embodiment.

In an embodiment, the CORDIC engine 502 is configured to further process the upper triangular matrix Q determined by the steps one through eight described above, to progressively annihilate rows of the upper triangular matrix Q by determining rotation angles to zero-out non-diagonal non-zero elements in the rows of the upper triangular matrix Q so that a diagonal matrix is determined with elements on the diagonal being real numbers R. For example, in a first annihilation step, the CORDIC engine 502 first annihilates the row, of the upper triangular matrix Q, that includes the diagonal element corresponding to (Nss−1)$^{th}$ spatial stream, which, in the 8×8 case, is the 7th spatial stream, in an embodiment. In subsequent annihilation steps, the CORDIC engine 502 progressively annihilates the remaining rows that include diagonal elements corresponding to remaining spatial streams. In a last annihilation step (7th annihilation step in the 8×8 case), the CORDIC engine 502 annihilates the first row, of the upper triangular matrix Q, that includes the diagonal element corresponding to the 1st spatial stream, in an embodiment. The CORDIC engine 502 stores resulting diagonal real values R (e.g., $R_1$-$R_8$) in the R memory, in an embodiment.

In an embodiment, the CORDIC engine 502 decomposes a plurality of channel matrices corresponding to a plurality of OFDM tones (e.g., 980 channel matrices corresponding to 980 OFDM tones in an 80 MHz bandwidth) over a plurality of CORDIC cycles. Each CORDIC cycle comprises a plurality of clock cycles, in an embodiment. For example, as explained in more detail below with reference to FIGS. 8 and 9, each CORDIC calculator 504 is configured to perform a channel matrix operation (e.g., a vector or a rotation operation on a particular channel matrix element) using a plurality of iterations over multiple clock cycles corresponding to a single CORDIC cycle, in an embodiment. For example, each CORDIC engine 502 perform a channel matrix operation using 11 iterations performed over 12 clock cycles, in an embodiment. Accordingly, in this embodiment a CORDIC cycle comprises 12 clock cycles. In other embodiments, other suitable numbers of iterations and clock cycles are utilized.

In different CORDIC cycles, the CORDIC engine 502 is configured to, in each CORDIC cycle, receive and perform processing of a subset of channel matrix elements corresponding to a subset of OFDM tones, in an embodiment. For example, in an embodiment, the CORDIC engine 502 is configured, in each CORDIC cycle, to receive and perform processing of a subset of channel matrix elements corresponding to 12 OFDM tones. In an embodiment, different ones of the matrix elements corresponding to different ones of OFDM tones progress through respective iteration of a CORDIC engine in different clock cycles of the CORDIC cycle.

In an embodiment, the CORDIC engine 502 is configured to receive channel matrices corresponding to subsets of OFDM tones over multiple burst cycles, wherein channel matrices corresponding to different subsets of OFDM tones are received in different burst cycles. For example, in an embodiment, the CORDIC engine 502 is configured to begin receiving a new subset of channel matrices every 4 CORDIC cycles, in an embodiment. In this embodiment, processing of a plurality of channel matrices corresponding to a plurality of OFDM tones is performed in a number of burst cycles determined by ceiling(number of OFDM tones/12). Thus, for example, processing of 980 channel matrices corresponding to 980 OFDM tones is performed in 82 burst cycles, in an embodiment.

In an embodiment, in each CORDIC cycle, each of the CORDIC calculators 504 is individually controlled to operate in a particular operating mode, including a i) a vector mode for determining a rotation angle based on input signals, ii) a rotation mode for applying a previously determined rotation angle to input signals, iii) a bypass mode for propagating input signals to output signals without altering the input signals, and iv) an idle mode for saving power when a particular circuit unit is not needed during a particular cycle. For example, the controller 512 is configured to control each particular CORDIC calculator 504 to operate in a particular mode on a per CORDIC cycle basis, depending on the specific operation that the particular CORDIC engine is to perform during the particular CORDIC cycle and whether or not the particular CORDIC engine is needed at all in the particular CORDIC cycle. In an embodiment, the controller 512 is configured to access a memory (not shown), such as one or more lookup tables stored in a memory, to retrieve control information for controlling the mode of each CORDIC calculator 504 for each CORDIC cycle. In an embodiment, the control information is in the form of a 12-bit word, with four bits corresponding to an enable indication, four bits corresponding to a bypass indication and four bits corresponding to vector/rotation indication. In an embodiment, each of the four bits of a particular indication (e.g., enable indication, bypass indication, vector/rotation indication) corresponds to a particular CORDIC cycle of four CORDIC cycles. In an embodiment, the controller 512 utilizes the following mapping to determine a particular mode for a particular CORDIC calculator 504 based on control information for a particular CORDIC cycle:

| Enable [3:0] | Bypass [3:0] | Vector/Rotation [3:0] | Operation Mode |
| --- | --- | --- | --- |
| 0 | x | x | Idle Mode |
| 1 | 1 | x | Bypass Mode |
| 1 | 0 | 0 | Vector Mode |
| 1 | 0 | 1 | Rotation Mode |

In other embodiments, other suitable forms of control information are utilized. The controller 512 is configured to index the one or more lookup tables by a particular channel matrix configuration (e.g., 8×8, 8×7, 8×6, etc.) being processed and the particular CORDIC cycle of the processing. Based on the control information retrieved from the one or more lookup tables for a particular CORDIC cycle, the controller controls the mode of each of the CORDIC calculator 504, in an embodiment.

Figure 7:
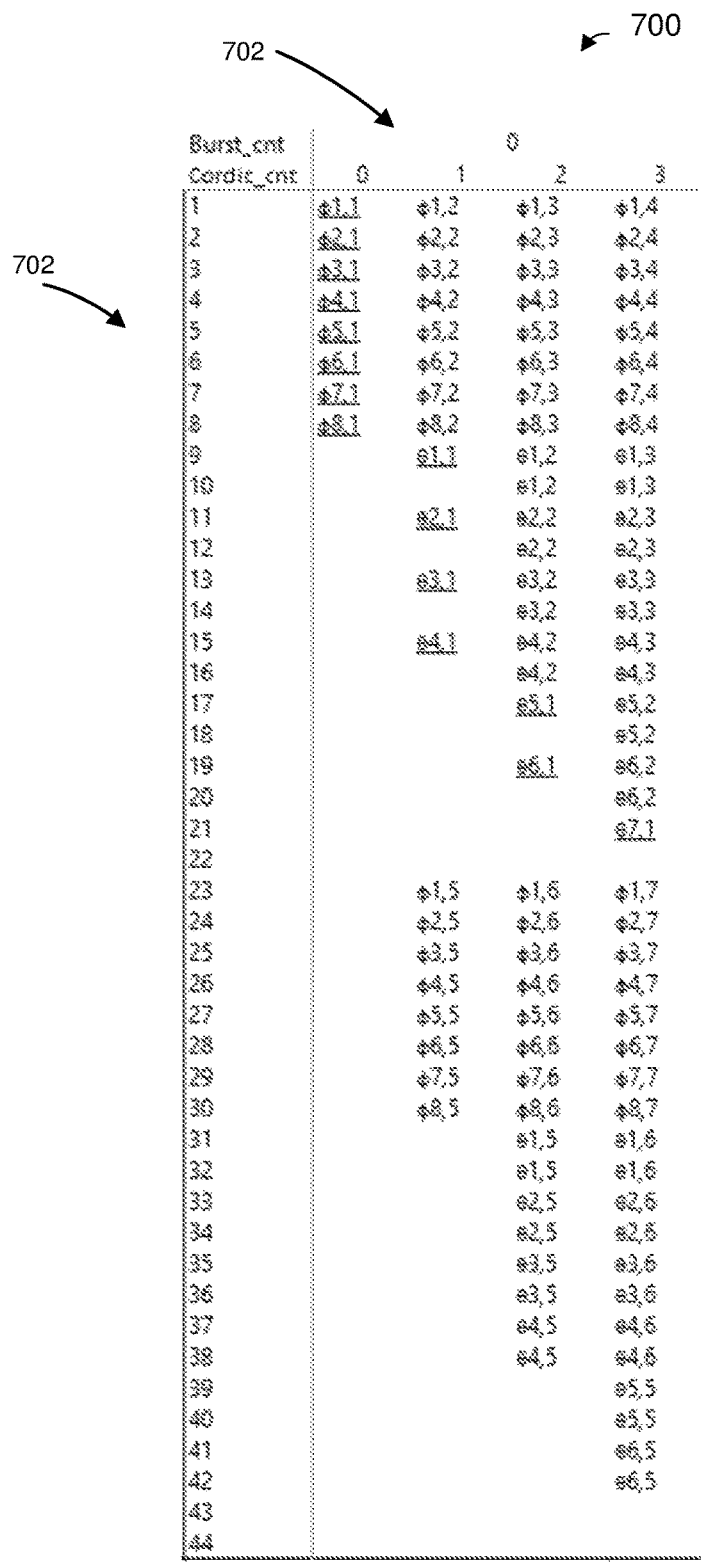
FIG. 7 is a snippet of an example pipeline processing of a first burst cycle of decomposing 8×8 channel matrices, according to an embodiment.

Referring briefly to FIG. 7, a snippet of an example pipeline processing 700 of a first burst cycle of decomposing a plurality of 8×8 channel matrices is illustrated. In FIG. 7, the indices in a column 702 correspond to CORDIC calculators 504, and the indices in a row 704 correspond to CORDIC cycles. In a first CORDIC cycle of the first burst cycles, the CORDIC engine 502 receives channel matrix elements corresponding to first 12 OFDM tones and first four spatial streams. First eight CORDIC calculators 504 (e.g., CORDIC calculators 1-8 in FIG. 7) perform processing of matrix elements corresponding to the first spatial stream. In particular, with eight Rx antennas, the first eight CORDIC calculators 504 operate in vector mode to determine rotation angles ψ for eight matrix elements corresponding to eight Rx antennas in the first spatial stream. For reference, vector mode is signified in FIG. 7 by underlining of the corresponding determined rotation angles ψ and θ. The remaining CORDIC calculators 504 (e.g., CORDIC calculators 9-204) that are not needed for the first CORDIC cycle, are controlled to operate in idle mode to save power, in an embodiment. In a second CORDIC cycle of the first burst cycle, the first eight CORDIC calculators 504 perform processing of the matrix elements corresponding to a second spatial stream. In particular, the first eight CORDIC calculators 504 operate in rotation mode to rotate channel matrix elements corresponding to eight receive antennas in the second spatial stream based on the rotation angles ψ determined in the first CORDIC cycle for the first spatial stream. Also in the second CORDIC cycle, four additional CORDIC calculators 504 (e.g., CORDIC calculators 9, 11, 13 and 15 in FIG. 7) perform vector operations to determine rotation angles θ to be used for upcoming seven spatial streams. Also in the second CORDIC cycle, additional eight CORDIC calculators 504 (e.g., CORDIC calculators 23-30 in FIG. 7) operate in rotation mode to rotate matrix elements corresponding to the fifth spatial stream based on the rotation angles determined w determined in the first CORDIC cycle for the first spatial stream. The remaining CORDIC calculators (e.g., CORDIC calculators 10, 12, 14, 16-22 and 31-204) that are not needed for the second CORDIC cycle, are controlled to operate in idle mode to save power, in an embodiment. This process continues as illustrated in FIG. 7 in the remaining CORDIC cycles of the first burst cycle. After the first burst cycle, a second burst cycle begins, and so on, in an embodiment. The second burst cycle follows the same pattern as the first burst cycle except that in the second burst cycle some of the CORDIC calculators 504 that were not used in a given CORDIC cycle are used to perform additional operations that still need to be performed to continue processing of the first burst cycle, in an embodiment. This burst cycle pattern results in high utilization of the CORDIC calculators 504. For example, in the 8×8 case, 98% utilization is achieved. In other embodiments, however, other suitable burst cycle patterns or other suitable burst cycles are utilized.

Referring again to FIG. 5, when operating in data symbol processing mode, the CORDIC engine 502 receives data symbols Y, and applies inverse of the upper triangular matrices Q, determined during QR decomposition, to the data symbols Y, in an embodiment. The CORDIC engine 502 is coupled to a channel pilot estimation processor 522, in an embodiment. The CORDIC engine 512 receives and processes data symbols Y processed by the channel pilot estimation processor 522, in this embodiment. The CORDIC calculators 504 of the CORDIC engine 512 are configured to perform vector and rotation operations for applying inverse of the upper triangular matrices Q to data symbols of corresponding spatial streams and corresponding OFDM tones. In the process of applying the inverse of the upper triangular matrix Q to the data symbols Y, the CORDIC engine 502 reads the rotation angles ψ and θ determined during QR decomposition from the memory 506, and rotates elements of the data symbols Y using the rotation angles ψ and θ. Rotating the elements of the data symbols Y is performed in steps in a process that is a reverse of the process described above with respect to QR decomposition, in an embodiment. Data symbols Y processed by the CORDIC engine 502 are represented in FIG. 5 by processed data symbols Z output by the CORDIC engine 502. The processed data symbols Z are provided to the ZF equalizer 510. The ZF equalizer 510 reads the values R, determined during QR decomposition, from the R memory 508 equalizes the processed symbols Z based on the values R. The equalized data symbols Z are represented in FIG. 5 by equalized data symbols W output by the ZF equalizer 510. The equalized data symbols W are provided to a soft metric processor 524, in an embodiment. The soft metric processor 524 determines, based on the equalized data symbols W, modulation symbols corresponding to the data symbols Y, in an embodiment.

Figure 8:
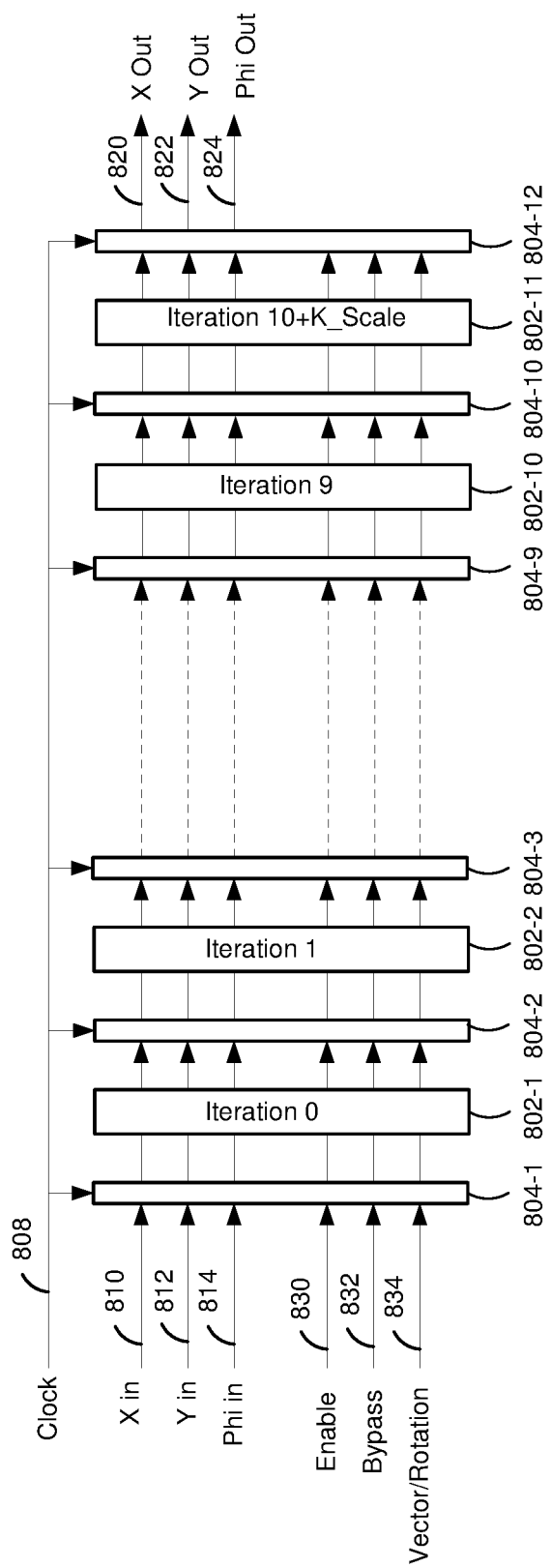
FIG. 8 is a block diagram of a coordinate rotation digital calculation (CORDIC) calculator, according to an embodiment.

In an embodiment, each CORDIC calculator 504 comprises circuitry that is configured to "rotate" a complex number by multiplying the complex number by a succession of constant values. In an embodiment, the constant values are powers of 2, so multiplications performed by the CORDIC calculator is performed using shift operations and add operations. FIG. 8 is a block diagram of a CORDIC calculator 800, according to an embodiment. The CORDIC calculator 800 corresponds to each of the CORDIC calculators 504 of FIG. 5, in an embodiment. In other embodiments, the CORDIC calculators 504 of FIG. 5 are different from the CORDIC calculator 800. For ease of explanation, the CORDIC calculator 800 is described with reference to FIG. 5. However, the CORDIC calculator 800 is used with systems different from the system 500 of FIG. 5.

The CORDIC calculator 800 includes a plurality of logic circuits 802 configured to iteratively perform add operations and shift operations to rotate a complex number. In the embodiment of FIG. 8, rotation is performed using 11 iterations in 12 clock cycles. The 11 iterations and 12 clock cycles comprise a single CORDIC cycle of the CORDIC calculator 870, in an embodiment. Accordingly, the CORDIC calculator 800 includes 11 logic circuits 802, in the illustrated embodiment. In other embodiments, other suitable number of iterations and corresponding other numbers of logic circuits 802 are utilized. The CORDIC calculator 800 also includes a plurality of resisters 804 configured to store values to be input to and output by the circuit units 804, in an embodiment. A clock signal 808 is gated to each of the registers 804, in an embodiment. The clock signal 808 drive the registers 804 at 320 MHz clock frequency, in an embodiment. In another embodiment, another suitable clock frequency is utilized.

The CORDIC calculator 800 includes a plurality of inputs, including a first input for receiving an x input signal 810, a second input for receiving a y input signal 812 and a third input for receiving a phi input signal 814, in an embodiment. The CORDIC calculator 800 also includes a plurality of outputs, including a first output for outputting an x output signal 820, a second output for outputting a y output signal 822 and a third output for outputting a phi output signal 824. Additionally, the CORDIC calculator 800 includes several control inputs, including an enable control input for receiving an enable control signal 830, a bypass control input for receiving a bypass control signal 832 and a vector/rotation control input for receiving a vector/rotation mode control signal 834, in an embodiment.

The x input signal 810 and y input signal 812 each comprises 19 bits, in an embodiment. Accordingly, the CORDIC calculator 800 is configured to receive the real and imaginary components digitized to 19 bits, in this embodiment. Thus, for example, when performing QR decomposition of a channel matrix, the CORDIC calculator 800 operates on real and imaginary components of an element of the channel matrix digitized to 19 bits, in this embodiment. Digitizing the real and imaginary components of the channel matrix to 19 bits provides sufficient precision to achieve sufficient performance for an 8×8 channel matrix, in an embodiment. In other embodiments, however, the x input signal 810 and/or the y input signal 812 comprises fewer than 19 bits or greater than 19 bits.

Figure 9:
FIG. 9 is a table illustrates micro-rotation angles implemented by respective logic circuits of a CORDIC calculator, according to an embodiment.

The controller 512 controls the CORDIC calculator 800 via the control input signals 830, 832, 834 to operate in one of four modes: a vector mode, a rotation mode, a bypass mode or an idle mode, in an embodiment. To control the vector/rotation mode of the CORDIC calculator 800, the controller 512 utilizes the vector/rotation mode control signal 834, in an embodiment. In an embodiment, the vector/rotation mode control signal 834 comprises one bit set to a first value (e.g., a logic one) to control the CORDIC calculator 800 to operate in vector mode or set to a second value (e.g., a logic zero) to control the CORDIC calculator 800 to operate in rotation mode. To control the bypass mode of the CORDIC calculator 800, the controller 512 utilizes the bypass mode control signal 832, in an embodiment. In an embodiment, the bypass mode control signal 832 comprises one bit set to a first value (e.g., a logic one) to control the CORDIC calculator 800 to operate in bypass mode or set to a second value (e.g., a logic zero) otherwise, or vice-versa, in an embodiment. To control the idle mode of the CORDIC calculator 800, the controller 512 utilizes the enable mode control signal 830, in an embodiment. In an embodiment, the enable mode control signal 830 comprises one bit set to a first value (e.g., a logic one) to control the CORDIC calculator 800 to enter idle mode or set to a second value (e.g., a logic zero) to operate in active mode, or vice-versa, in an embodiment In an embodiment, when operating in vector mode, the CORDIC calculator 800 receives digitized values value $x_{in}$ and $y_{in}$ at the inputs 810 and 812, respectively. The CORDIC calculator 800 operates on the received values $x_{in}$ and $y_{in}$ to calculate a rotation angle of $x_{in}/y_{in}$ by which $x_{in}$ and $y_{in}$ need to be rotated to zero out the imaginary input $y_{in}$ resulting in y_out=0, $x_{out}=\sqrt{x\_in^2 y\_in^2}$, and $phi_{out}=\arctan(x_{in}/y_{in})$. Referring briefly to FIG. 9, a table 900 illustrates micro-rotation angles implemented by respective logic circuits 802 in the 11 iterations (iterations 0-10) performed the CORDIC calculator 800, according to an embodiment. With continued reference to FIG. 8, The phi output 824 comprises 11 bits indicating a direction of the rotation for each of the 11 iterations. For example, a value of logic zero of a bit of the phi output 824 indicates anticlockwise rotation direction for the iteration corresponding to the bit location in the phi output 824 and a value of logic one of a bit of the phi output 824 indicates clockwise rotation direction for the iteration corresponding to the bit location in the phi output 824 (or vice versa), in an embodiment. The $phi_{out}$ value is directly used as an input to a subsequent CORDIC calculator 504 that is next to use the value and/or is temporarily in a memory (e.g., the P memory 506 or another suitable memory), in various embodiments.

In an embodiment, when operating in rotation mode, the CORDIC calculator 800 receives digitized values $x_{in}$ and $y_{in}$ at the inputs 810 and 812, respectively. The CORDIC calculator 800 additionally receives a $phi_{in}$ value at the phi input 814. The $phi_{in}$ value corresponds to a previously determined $phi_{out}$ value, in an embodiment. The $phi_{in}$ value corresponds to a phi value retrieved from a memory (e.g., the P memory 506), in an embodiment. The $phi_{in}$ value comprises 11 bits indicating a direction of the rotation for each of the 11 iterations of the CORDIC calculator 800. For example, a value of logic zero of a bit of the $phi_{in}$ value indicates anticlockwise rotation direction for the iteration corresponding to the bit location in the phi output 824 and a value of logic one of a bit of the of the $phi_{in}$ value indicates clockwise rotation direction for the iteration corresponding to the bit location in the phi output 824 (or vice versa), in an embodiment. Referring to FIG. 8, the CORDIC calculator 800 iteratively performs the rotations on the received values $x_{in}$ and $y_{in}$, with the degrees of each rotation indicated for the corresponding iteration in the table 800, with the direction of rotation indicated by the corresponding bit in the $phi_{in}$ value, according to an embodiment. The resulting values $x_{out}$ and $y_{out}$ after the last iteration are presented at, respectively, the x output interface 820 and the y output interface 822, in an embodiment. The $x_{out}$ and $y_{out}$ values are directly used as inputs to a subsequent CORDIC calculator 504 that is next to operate on the values and/or are stored in a memory (e.g., the R memory 508) for subsequent use, in various embodiments.

In an embodiment, when operating in bypass mode, the CORDIC calculator 800 receives digitized values $x_{in}$ and $y_{in}$ at the inputs 810 and 812, respectively. The CORDIC calculator 800 shifts the received $x_{in}$ and $y_{in}$ through the registers 804, without performing any operations on the received values by the logic circuit units 802, in an embodiment. The values $x_{in}$ and $y_{in}$ are then presented at, respectively, the x output interface 820 and the y output interface 822, in an embodiment. Accordingly, in bypass mode, the CORDIC calculator 800 introduces latency delay to the inputs 810 and 812 without altering the inputs 810 and 812, in an embodiment. The bypass mode is used to when the CORDIC engine 502 is operating in a mode with less than a maximum supported number of Rx antennas, in order to keep the same pipeline delay as in the case with the maximum supported number of Rx, in an embodiment. In particular, in bypass mode, the CORDIC calculator 800 is reused as a delay register for operations that need not be performed due to a reduction in the number of Rx antennas. As just an example, in an embodiment which the maximum number of Rx antennas supported by the CORDIC engine 502 is 8, the CORDIC calculator 800 is reused as a delay register when the CORDIC engine 502 is processing a 7×7 channel matrix for operations associated with determining rotation angles θ in connection with zeroing out elements $H_{8i}$ for i=1-8, in an embodiment. Bypass mode of the CORDIC calculator 800 eliminates additional registers or memory for temporality storing the values $x_{in}$ and $y_{in}$ when particular operations on $x_{in}$ and $y_{in}$ need not be performed due to reduction in the number of Rx antennas, thereby reducing overall size and power consumption of the matrix equalizer 500, in an embodiment.

In an embodiment, when controlled to operate in idle mode, the CORDIC calculator 800 is disabled and enters an idle state to save power. For example, the CORDIC calculator 800 is disabled by disconnecting the clock signal 808 from the register 804 to eliminate power consumption by the CORDIC calculator 800, in an embodiment. In an embodiment, the idle mode is used to disable the CORDIC calculator 800 in non-valid CORDIC cycle operation of the matrix equalizer 500, for example before and/or after channel matrices or data symbols pass through the CORDIC engine 502 or pass through a particular CORDIC calculator 504 of the CORDIC engine 502. Additionally or alternatively, disable mode is used when the CORDIC engine 502 is operating in a mode with less than a maximum supported number of Rx antennas and/or less than a maximum number of supported spatial streams. As just an example, in an embodiment in which the maximum number of Rx antennas and the number of spatial streams supported by the CORDIC engine 502 is 8 and the channel matrix being processed by the CORDIC calculator 800 is an 8×7 channel matrix, the CORDIC calculator 800 is disabled for a particular CORDIC cycle if the CORDIC calculator 800 would be used for operations associated with determining a rotations angle rotation angles ψ or a rotation angles θ in connection with elements $H_{8i}$ for i=1-8, in an embodiment.

Figure 10:
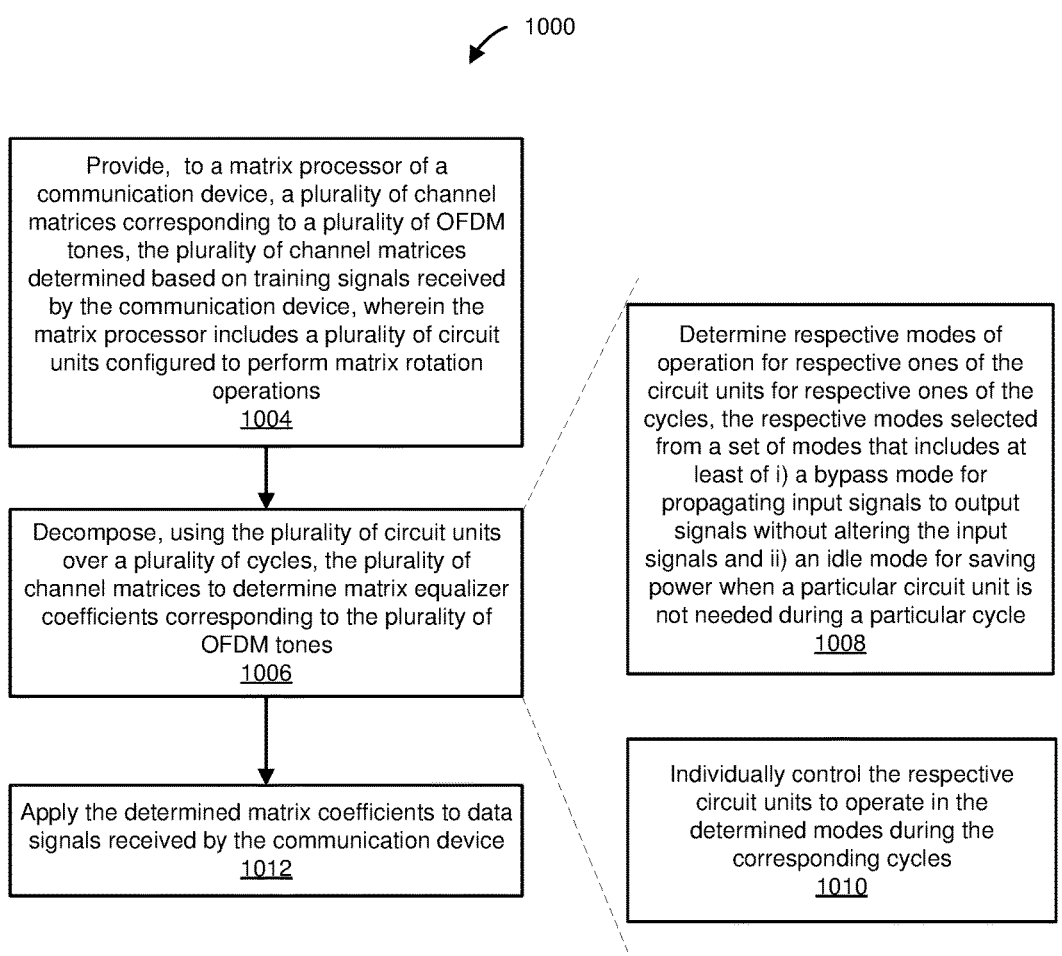
FIG. 10 is a flow diagram of an example method for channel equalization, according to an embodiment.

FIG. 10 is a flow diagram of an example method 1000 for channel equalization, according to an embodiment. In some embodiments, the network interface 122 and/or the network interface 162 of FIG. 1 is configured to implement the method 1000. In an embodiment, the matrix equalizer 500 of 500 is configured to implement the method 1000. In other embodiments, the method 1000 is implemented by other suitable matrix equalizers and/or by other suitable communication devices.

The method 1000 is described, however, in the context of the client station 154 merely for explanatory purposes and, in other embodiments, the method 1000 is implemented by another suitable device, such as the AP 114 or any other communication device.

At block 1002 a plurality of channel matrices corresponding to a plurality of OFDM tones are provided to a matrix processor of a communication device. In an embodiment, the plurality of channel matrices are determined based on training signals received by the communication device. In an embodiment, the plurality of channel matrices are determined based on HE-LTFs 230 of the packet 200 of FIG. 2. In another embodiment, the plurality of channel matrices are determined based on other suitable training signals. In an embodiment, the plurality of channel matrices are provided to the CORDIC engine 502 of FIG. 5. In another embodiment, the plurality of channel matrices a suitable matrix processor different from the CORDIC engine 502. In an embodiment, the matrix processor comprises a plurality of circuit units (e.g., CORDIC calculator 504 of FIG. 5 or other suitable circuit units) configured to perform matrix rotation operations.

At block 1006, the plurality of channel matrices are decomposed to determine to determine matrix equalizer coefficients corresponding to the plurality of OFDM tones. In an embodiment, the plurality of channel matrices are decomposed using the plurality of circuit units of the matrix processor over a plurality of cycles. For example, the plurality of channel matrices are decomposed using the plurality of CORDIC calculator 504 over a plurality of CORDIC cycles as described above. In other embodiments, the plurality of channel matrices are decomposed using the plurality of circuit units of the matrix processor over a plurality of cycles in other suitable manners.

Decomposing the plurality of channel matrices at block 1006 includes blocks 1008 and 1010, in an embodiment. At block 1006, respective modes of operation for respective ones of the circuit units for respective ones of the cycles are determined. In an embodiment, the respective modes of operation selected from a set of modes that includes at least one of i) a bypass mode for propagating input signals to output signals without altering the input signals and ii) an idle mode for saving power when a particular circuit unit is not needed during a particular cycle. For example, in an embodiment, the controller 512 of FIG. 5 determines the respective modes on per-cycle and per-matrix configuration basis as described above. In other embodiments, the respective modes are determined in other suitable manners. At block 1008, the respective circuit units are individually controlled to operate in the determined respective modes during the corresponding cycles.

At block 1012, the matrix coefficients determined at block 1006 are applied to data signals received by the communication device. For example, the matrix processor (e.g., the CORDIC engine 502 of FIG. 5) at least partially applies the matrix coefficients to data signals received by the communication device. In another embodiment, another suitable component of the communication device applies the matrix coefficients to data signals received by the communication device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
providing, at a communication device to a matrix processor of the communication device, a plurality of channel matrices corresponding to a plurality of orthogonal frequency division multiplexing (OFDM) tones, the plurality of channel matrices determined based on training signals received by the communication device, wherein the matrix processor includes a plurality of circuit units configured to perform matrix rotation operations;
decomposing, using the plurality of circuit units over a plurality of cycles, the plurality of channel matrices to determine matrix equalizer coefficients corresponding to the plurality of OFDM tones, wherein decomposing the plurality of channel matrices includes
determining respective modes of operation for respective ones of the circuit units for respective ones of the cycles, the respective modes of operation selected from a set of modes that includes at least one of i) a bypass mode for propagating input signals to output signals without altering the input signals and ii) an idle mode for saving power when a particular circuit unit is not needed during a particular cycle, and
individually controlling the respective circuit units to operate in the determined respective modes during the corresponding cycles; and
applying, at the communication device, the determined matrix coefficients to data signals received by the communication device.

2. The method of claim 1, wherein decomposing the plurality of channel matrices includes performing, in particular cycles of the plurality of cycles, respective subsets of operations for decomposing the channel matrices, the respective subsets of operations performed on channel matrix elements corresponding to respective subsets of spatial streams and respective subsets of subset of OFDM tones.

3. The method of claim 1, wherein decomposing a particular channel matrix, of the plurality of channel matrices, comprises decomposing the particular channel matrix using multiple circuit units of the plurality of circuit units in each cycle of the plurality of cycles, wherein respective ones of the multiple circuit units perform respective subsets of rotation operations needed to decompose the particular channel matrix.

4. The method of claim 1, wherein the set of modes further includes i) a vector mode for determining a rotation angle based on input signals and ii) a rotation mode for applying a previously determined rotation angle to input signals.

5. The method of claim 4, wherein individually controlling respective circuit units includes
controlling one or more units to operate in the idle mode when the one or more units are not needed during a first cycle of decomposing a particular channel matrix, and
controlling the one or more units to operate in an active mode when the one or more units are needed during a second cycle of decomposing the particular channel matrix.

6. The method of claim 4, wherein the matrix processor is configured to support channel matrix decomposition of channel matrices corresponding to a particular maximum number of receive antennas, and wherein individually controlling respective circuit units includes controlling one or more units to operate in the bypass mode for particular unneeded matrix rotation operations when the communication device is operating with a number of receive antennas that is less than the particular maximum number of receive antennas.

7. The method of claim 1, wherein individually controlling the circuit units includes,
retrieving, from memory based on an indicator of a particular cycle, control information for respective circuit units for the particular cycle, and
individually controlling the respective circuit units based on the retrieved control information.

8. The method of claim 1, wherein decomposing a particular channel matrix, of the plurality of channel matrices, includes
performing QR decomposition of the particular channel matrix to obtain an upper triangular matrix Q;
storing rotation angles determined during QR decomposition in a P memory;
performing row annihilation on rows of the upper triangular matrix P to obtain a diagonal matrix R; and
storing diagonal elements of the diagonal matrix R in an R memory.

9. The method of claim 7, wherein applying the determined equalizer matrix coefficients to data signals received includes
applying, using the rotation angles stored in the P memory, an inverse of the Q matrix to a data symbol compensate for effects of the communication channel on the data symbol, and
after compensating for the effects of the communication channel on the data symbol, performing zero forcing equalization on the data symbol using the diagonal elements stored in the R memory.

10. The method of claim 1, wherein
the plurality of circuit units includes a coordinate rotation digital calculation (CORDIC) unit configured to perform multiple angle rotation iterations to complete a particular matrix rotation operation, and
decomposing the plurality of channel matrices includes performing, using the CORDIC unit in a particular cycle, the particular matrix operation on matrix elements corresponding to respective OFDM tones of a subset of the plurality of OFDM tones, wherein a respective matrix element corresponding to a respective OFDM tone undergoes a respective iteration of the particular matrix rotation operation.

11. An apparatus, comprising:
a matrix processor comprising a plurality of circuit units configured to perform matrix rotation operations, the matrix processor configured to decompose, using the plurality of circuit units over a plurality of cycles, a plurality of channel matrices corresponding to a plurality of orthogonal frequency division multiplexing (OFDM) tones, wherein the plurality of channel matrices are determined based on received training signals; and
a controller configured to control operation of respective circuit units of the plurality of circuit units during decomposition of the plurality of channel matrices, the controller being configured to
determine respective modes of operation for respective ones of the circuit units for respective ones of the cycles, the respective modes of operation selected from a set of modes that includes at least one of i) a bypass mode for propagating input signals to output signals without altering the input signals and ii) an idle mode for saving power when a particular circuit unit is not needed during a particular cycle, and
individually control the respective circuit units to operate in the determined respective modes during the corresponding cycles.

12. The apparatus of claim 11, wherein the matrix processor is configured to perform, in particular cycles of the plurality of cycles, respective subsets of operations for decomposing the channel matrices, the respective subsets of operations performed on channel matrix elements corresponding to respective subsets of spatial streams and respective subsets of subset of OFDM tones.

13. The apparatus of claim 11, wherein the matrix processor is configured to decompose a particular channel matrix, of the plurality of channel matrices, at least by decomposing the particular channel matrix using multiple circuit units of the plurality of circuit units in each cycle of the plurality of cycles, wherein respective ones of the multiple circuit units perform respective subsets of rotation operations needed to decompose the particular channel matrix.

14. The apparatus of claim 11, wherein the set of modes further includes i) a vector mode for determining a rotation angle based on input signals and ii) a rotation mode for applying a previously determined rotation angle to input signals.

15. The apparatus of claim 14, wherein the controller is configured to
control one or more units to operate in the idle mode when the one or more units are not needed during a first cycle of decomposing a particular channel matrix, and
control the one or more units to operate in an active mode when the one or more units are needed during a second cycle of decomposing the particular channel matrix.

16. The apparatus of claim 14, wherein
the matrix processor is configured to support channel matrix decomposition of channel matrices corresponding to a particular maximum number of receive antennas,
the controller is configured to control one or more units to operate in the bypass mode for particular unneeded matrix rotation operations when the communication device is operating with a number of receive antennas that is less than the particular maximum number of receive antennas.

17. The apparatus of claim 11, wherein the controller is configured to
retrieve, from memory based on an indicator of a particular cycle, control information for respective circuit units for the particular cycle, and
individually control the respective circuit units based on the retrieved control information.

18. The apparatus of claim 11, wherein the matrix processor is configured to decomposing a particular channel matrix, of the plurality of channel matrices, at least by
performing QR decomposition of the particular channel matrix to obtain an upper triangular matrix Q;
storing rotation angles determined during QR decomposition in a P memory;
performing row annihilation on rows of the upper triangular matrix P to obtain a diagonal matrix R; and
storing diagonal elements of the diagonal matrix R in an R memory.

19. The apparatus of claim 17, wherein the matrix processor is further configured to apply the determined equalizer matrix coefficients to received data signals, wherein the matrix processor is configured to apply, using the rotation angles stored in the P memory, an inverse of the Q matrix to a data symbol compensate for effects of the communication channel on the data symbol, and after compensating for the effects of the communication channel on the data symbol, perform zero forcing equalization on the data symbol using the diagonal elements stored in the R memory.

20. The apparatus of claim 11, wherein the plurality of circuit units includes a coordinate rotation digital calculation (CORDIC) unit configured to perform multiple angle rotation iterations to complete a particular matrix rotation operation, and wherein the CORDIC unit is configured to perform, in a particular cycle, the particular matrix operation on matrix elements corresponding to respective OFDM tones of a subset of the plurality of OFDM tones, wherein a respective matrix element corresponding to a respective OFDM tone undergoes a respective iteration of the particular matrix rotation operation.

* * * * *